Patented Dec. 19, 1939

2,183,782

UNITED STATES PATENT OFFICE 2,183,782

PROCESS FOR DESULPHURIZING OIL

Ulric B. Bray, Palos Verdes Estates, Calif., assignor to Union Oil Company of California, Los Angeles, Calif., a corporation of California No Drawing. Application September 28, 1936, Serial No. 102,978

9 Claims. (Cl. 196—28)

This invention relates to the treatment of petroleum fractions which contain mercaptans such as gasoline and kerosene in order to convert the mercaptans into organic sulphides which may be readily removed by sulphuric acid or clay treatment or the like or if retained in the gasoline or other distillate in small quantities are not objectionable.

In converting mercaptans the ordinary action would be $2RSH \rightleftharpoons H_2S + RSR$. This action is reversible unless provision is made for the elimination of the hydrogen sulphide as formed.

I have discovered, as disclosed in my earlier application Serial No. 384,985, filed August 10, 1929, of which this is a continuation in part, that iron sulphides act as catalysts for the conversion of mercaptans at somewhat elevated temperatures. According to the present case, I have discovered that by employing any porous or sedimentary type of iron oxide such as red iron ore or yellow iron ore (limonite) and treating the gasoline or other petroleum distillate in vapor phase in the presence of such an iron oxide in a treating tower or other suitable contact apparatus, when the conversion of the mercaptans commences to yield hydrogen sulphide and alkyl sulphide according to the above equation, the iron oxide reacts with the liberated hydrogen sulphide to form iron sulphide and thereby remove the hydrogen sulphide from the process. This prevents the reversible reaction back to mercaptans. At the same time the iron sulphide which is formed by such union with the hydrogen sulphide acts as a catalyst to catalyze the mercaptan-conversion reaction.

Thus the process continues actively whereby the mercaptans are converted under the catalytic action of the iron sulphide formed, and the formed hydrogen sulphide is removed by reaction to form iron sulphide, thereby preventing reversal to mercaptans. In a similar fashion zinc oxide may be employed with corresponding reactions, zinc sulphide being produced which catalyzes the mercaptan conversion, the hydrogen sulphide being removed by union with the zinc to produce the zinc sulphide.

These operations, as before indicated, will be carried on in suitable contact apparatus such as towers containing the iron oxides and sulphides or zinc oxides and sulphides, at suitably elevated temperatures. Such temperatures are in the neighborhood of 400° F. to 650° F. The material being treated is passed through the towers in vapor phase under the temperatures employed. The exact temperature to be used is that found the best adapted for the particular oxide or sulphide, having in mind the color of the product obtained, the life of the catalyst and like considerations obvious to the petroleum technologist.

According to one operation, the gasoline or other sulphur-bearing petroleum distillate is first treated in a clay tower according to well known clay treating practices for the purpose of initially removing therefrom as much gums as possible. In this manner the iron or zinc sulphide catalysts subsequently used are protected from the gums which exert an inhibiting or poisoning action.

After the treatment of the distillate in the clay tower to remove the gum, the distillate is then given a second treatment wherein it is passed in vapor phase through a tower or equivalent contact apparatus containing the iron or zinc oxide above described. Here, at a temperature between about 400° to 650° F. above mentioned, the mercaptan conversion commences and the liberated hydrogen sulphide immediately reacts with some of the iron oxide to produce iron sulphide. Thus the tower now contains a mixture of iron oxide and iron sulphide. In turn the iron sulphide catalyzes the mercaptan conversion with the resultant formation of additional quantities of alkyl sulphides or kindred organic sulphides along with the formation of hydrogen sulphide which reacts with further quantities of iron oxide to produce additional quantities of iron sulphide.

The resultant organic sulphides are soluble in the treated distillate and are of course removed from the conversion tower in the distillate. If the original stock is such that the quantity of converted organic sulphides is not objectionable, or the quantity of unsaturated material is not objectionable, the product may be employed without further treatment. However, ordinarily the quantity of the converted sulphides, the color of the product, the quantity of unsaturates, and sometimes resultant gums are such as to be objectionable.

For this purpose the distillate from the catalytic mercaptan-conversion tower is given a third treatment for removal of these objectionable materials. This may be effected by treatment with sulphuric acid followed by redistillation, according to such treatment well known in the art in other connections. The organic sulphides formed by the above described conversion of mercaptans are more readily soluble in sulphuric acid than the original mercaptans and are readily removable thereby. Again, the distillate containing the converted organic sulphides may be passed in vapor phase through a second clay tower for removal of gum, color bodies, organic sulphides and other objectionables. Or a hot contact process under pressure with clay in tubes or in a clay tower or otherwise, as where the distillate containing the organic sulphides is treated in the liquid phase in admixture or contact with clay at temperatures around 500° F., may be employed. Here, after passing through the clay, the so-treated distillate is flashed off, leaving polymers of olefines and diolefines and similar materials behind, or otherwise fractionated for elimination of such substances. Of course, if sufficient fractionation is made to take place in the clay tower itself for removal of those objectionable materials, further treatment would not be necessary. But if the tower is too hot or the boiling range too narrow, separate fractionation ordinarily would be required. In any of these manners, a finished product of marketable character is produced from the catalytically treated material.

Where a clay tower is employed for this final finishing step, the clay will eventually become ineffective for adequate finishing. In that case the flow may be switched so that the incoming feed stock now receives its first treatment for gum removal in said clay tower which had previously been the finishing tower. In that instance, after conversion in the catalytic treater the catalytically treated distillates may be finished in a fresh clay tower. If desired, the iron or zinc sulphide resulting from the process may be treated to regenerate the oxide formed in any suitable manner, thereby making all phases of the process continuous. For example, the resultant sulphides may be blown with air diluted with steam or flue gas at 800° F.–1100° F. Similarly, the clay from the clay treats may be regenerated by any known or preferred method and returned to the circuit.

It is pointed out that this process is particularly valuable for several reasons: first, the iron oxide or zinc oxide provides an effective means for production of the catalytic sulphide whereby effective conversion of mercaptans is obtained; second, it permits the employment of cheap naturally occurring suitable starting materials in the form of red or yellow iron ores, and suitable zinc oxide; third, it provides means for disposition of the generated hydrogen sulphide as formed. It is also noted that the porous sedimentary type of ores are to be employed as distinguished from the dense type such as that produced by pyrogeneous or igneous action of which magnetic iron oxide (magnetite) is an example. Similarly, zincite in its granular form, which is the native deep red or orange yellow zinc oxide, may be employed.

Obviously, iron or zinc sulphide can be used direct without starting with the oxide provided the generated hydrogen sulphide is removed sufficiently to prevent objectionable reversible reaction or otherwise is not present to such extent. Also mixtures of iron and zinc sulphides or of iron and zinc oxides can be employed, and to a certain extent these mixtures (especially of oxides) are advantageous inasmuch as each oxide or sulphide appears to exert influences in the presence of the other that it will not exert alone. The use of oxides as starting materials is preferred to sulphides because of the resultant removal of hydrogen sulphide thereby.

It is to be understood that the disclosures herein are merely illustrative of the invention claimed and are not to be taken as limiting.

I claim:

1. A method for treating light petroleum oil distillates of the type of gasoline and kerosene containing objectionable organic sulphur compounds which comprises vaporizing the distillate and contacting the vapors with a porous oxide of zinc at a temperature to react some of the oxide with said organic sulphur compounds to produce a catalytic metal sulphide and continuing the contact at temperatures wthin the range of 400° F. to 650° F. to convert the organic sulphur compounds into organic sulphides and separating the distillate from said metal oxides and sulphides.

2. A process according to claim 1 wherein the distillate is treated with an agent for the removal of gums.

3. A process according to claim 1 wherein the distillate is treated with an agent to remove gums, color bodies and said converted organic sulphides.

4. A process for treating light petroleum oil distillates containing objectionable organic sulphur compounds which comprises vaporizing the oil, contacting the resultant vapors with a mixture of oxides and catalytic sulphides of both iron and zinc under conditions at elevated temperature to convert said organic sulphur compounds to other forms, and removing the treated distillate from such metal oxides and sulfides.

5. A process according to claim 4 wherein the treated distillate is further treated with sulphuric acid to remove converted organic sulphur compounds, gums and color bodies.

6. A process according to claim 4 and the additional step of subjecting the catalytically treated distillate to contact with clay materials to remove gums, color bodies, converted organic sulphur compounds and the like.

7. A process for treating light petroleum oil of the group consisting of gasoline and kerosene containing organic sulphur compounds which comprises vaporizing said oil, and contacting the oil vapors with zinc sulphide at a temperature within the range of 400° F. to 650° F. and in the absence of added gases supplying hydrogen, thereby converting the sulphur compounds into organic sulphides.

8. A process for treating light petroleum oil of the group consisting of gasoline and kerosene containing organic sulphur compounds which comprises vaporizing said oil, contacting the oil vapors with zinc sulphide at a temperature within the range of 400° F. to 650° F. and in the absence of added gases supplying hydrogen, thereby converting the sulphur compounds into organic sulphides and subsequently treating said oil with sulphuric acid to produce oil of lower sulphur content.

9. A process for treating light petroleum oil distillates containing objectionable organic sulphur compounds which comprises vaporizing the oil, contacting the resultant vapors with a mixture of oxides and catalytic sulphides of both iron and zinc under conditions at elevated temperature to convert said organic sulphur compounds to other forms, removing the treated distillate from such metal oxides and sulphides, and treating said treated distillate with an agent to remove converted organic sulphur compounds, gums and color bodies.

ULRIC B. BRAY.